United States Patent
Dickens et al.

(10) Patent No.: US 7,574,592 B2
(45) Date of Patent: Aug. 11, 2009

(54) APPROVAL PROCESS FOR BOOTING DEVICES IN PRE-BOOT EXECUTION ENVIRONMENT (PXE)

(75) Inventors: Christopher Scott Dickens, Issaquah, WA (US); Asad Yaqoob, Redmond, WA (US); Saad Syed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/358,243

(22) Filed: Feb. 21, 2006

(65) Prior Publication Data

US 2007/0198820 A1 Aug. 23, 2007

(51) Int. Cl.
*G06F 9/00* (2006.01)

(52) U.S. Cl. .................. 713/2; 713/1; 713/100

(58) Field of Classification Search ........ 713/1, 713/2, 100
See application file for complete search history.

(56) References Cited

U.S. PATENT DOCUMENTS

| | | | |
|---|---|---|---|
| 5,933,631 A | 8/1999 | Mealey et al. | |
| 6,807,558 B1* | 10/2004 | Hassett et al. | 709/203 |
| 6,816,964 B1 | 11/2004 | Suzuki et al. | |
| 7,251,725 B2 | 7/2007 | Loison et al. | |
| 7,305,561 B2 | 12/2007 | Hunt et al. | |
| 7,330,118 B2 | 2/2008 | Durham et al. | |
| 7,467,295 B2 | 12/2008 | Erickson et al. | |
| 2002/0091686 A1* | 7/2002 | Keith, Jr. | 707/5 |
| 2002/0120721 A1 | 8/2002 | Eilers et al. | |
| 2002/0198972 A1 | 12/2002 | Babbitt et al. | |
| 2003/0005096 A1 | 1/2003 | Paul et al. | |
| 2003/0131152 A1 | 7/2003 | Erlingsson | |
| 2004/0019630 A1* | 1/2004 | Burbeck et al. | 709/203 |
| 2004/0081104 A1 | 4/2004 | Pan et al. | |
| 2005/0180326 A1 | 8/2005 | Goldflam et al. | |
| 2006/0143432 A1 | 6/2006 | Rothman et al. | |
| 2007/0157016 A1 | 7/2007 | Dayan et al. | |
| 2008/0046708 A1* | 2/2008 | Fitzgerald et al. | 713/2 |

FOREIGN PATENT DOCUMENTS

JP  2002169694  6/2002

OTHER PUBLICATIONS

Cowan, Paul, "What is PXE?", White Paper, 2001, 8 pages, 3Com Corporation, Santa Clara, CA.

* cited by examiner

*Primary Examiner*—Tse Chen
(74) *Attorney, Agent, or Firm*—Senniger Powers LLP

(57) ABSTRACT

Approving a client to boot in a pre-boot execution environment. A request is received from the client to boot the client by a computing device. The request includes device information associated with the client. A data store having a collection of known device information is queried in response to the received request. The request is stored, and it is determined whether to execute the received request by evaluating the device information in the stored request. The received request is responded to as a function of the evaluated device information.

16 Claims, 6 Drawing Sheets

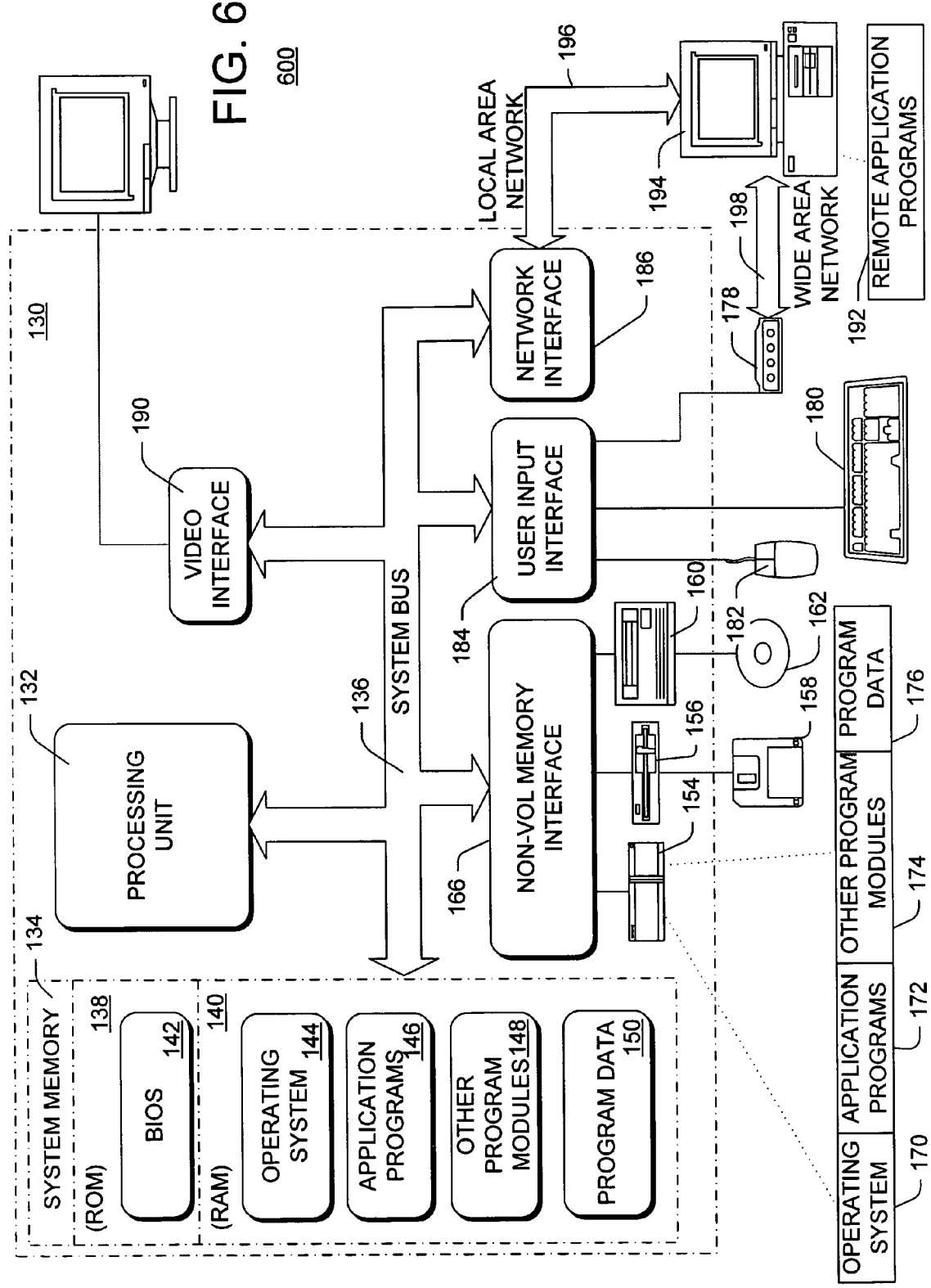

US 7,574,592 B2

APPROVAL PROCESS FOR BOOTING DEVICES IN PRE-BOOT EXECUTION ENVIRONMENT (PXE)

BACKGROUND

When deploying an operating system to multiple computing devices, it is beneficial to utilize tools to automate the deployment process. For example, in a computing device manufacturing process, an original equipment manufacturer (OEM) typically installs an operating system (OS) with standard configurations or a standard OS to the computing device before customers purchase them at retail stores or over the Internet. In a corporate setting, a business may need to upgrade a number of identically configured machines simultaneously and efficiently using such automated process.

Typically, the standard OS is deployed and installed automatically to the computing devices by copying or duplicating a pre-determined OS image to the computing device for booting the computing device. For example, the automated deployment and installation process would install the OS with standard configurations on a memory storage area of each of the computing devices via a wired or a wireless connection. Upgrades to OS or other applications may be installed in a similar fashion.

However, with the ongoing advancements and developments in storage medium and computing device processing powers, installing a standard set of OS image to a number of computing devices no longer accounts for proper configuration of the computing devices.

One available system, Pre-Boot Execution Environment (PXE) protocol, allows a client to obtain an OS image from a PXE server in a networked environment. The client initiates the PXE process by broadcasting a PXE request in the networked environment. However, any PXE server listening for a request can read and choose to respond to the client. A disadvantage results if more than one PXE server exists in the networked environment because the client will be serviced by whichever PXE server responds the quickest to the client's request. For example, if two PXE servers are in the networked environment, the first configured with application logic to service personal computer clients and a second configured to service any type of device (e.g., personal computers, point of sale devices, and network servers), it is not possible to determine which PXE server will be the first to respond to the request from a point of sale device client. Therefore, it is possible that, while using the PXE protocol, the point of sale device may incorrectly receive a boot image for a personal computer.

In addition, not only does an entity needs to deploy an OS on a number of different classes of computing devices, from personal digital assistant (PDA), to server computers, to point of sale terminals, the entity also needs to consider that each class of the computing devices may require particular configurations due to hardware components. For example, a PDA X with a chip having a processing power of 500 MHz and a storage memory capacity of 5 GB may require a different OS image from another PDA Y in the same production line with a chip having a processing power of 733 MHz and a storage memory capacity of 10 GB. As such, the existing OS image deployment systems of installing an OS with standard configuration or a standard OS image would not properly configure the PDA Y because both PDA X and PDA Y would receive the same OS image for booting the devices. In addition, current OS image deployment systems lack the ability to efficiently respond to clients that are unknown to the server.

SUMMARY

Embodiments of the invention overcome shortfalls of existing OS boot image deployment systems by placing the unknown clients in an intermediate storage awaiting approval by an administrator or an automated process. By approving or denying unknown client's request, the server may send an OS image to the client and adds the client to the data store storing known clients.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 6 is a block diagram illustrating one example of a suitable computing system environment in which the invention may be implemented.

Corresponding reference characters indicate corresponding parts throughout the drawings.

DETAILED DESCRIPTION

Figure 1:
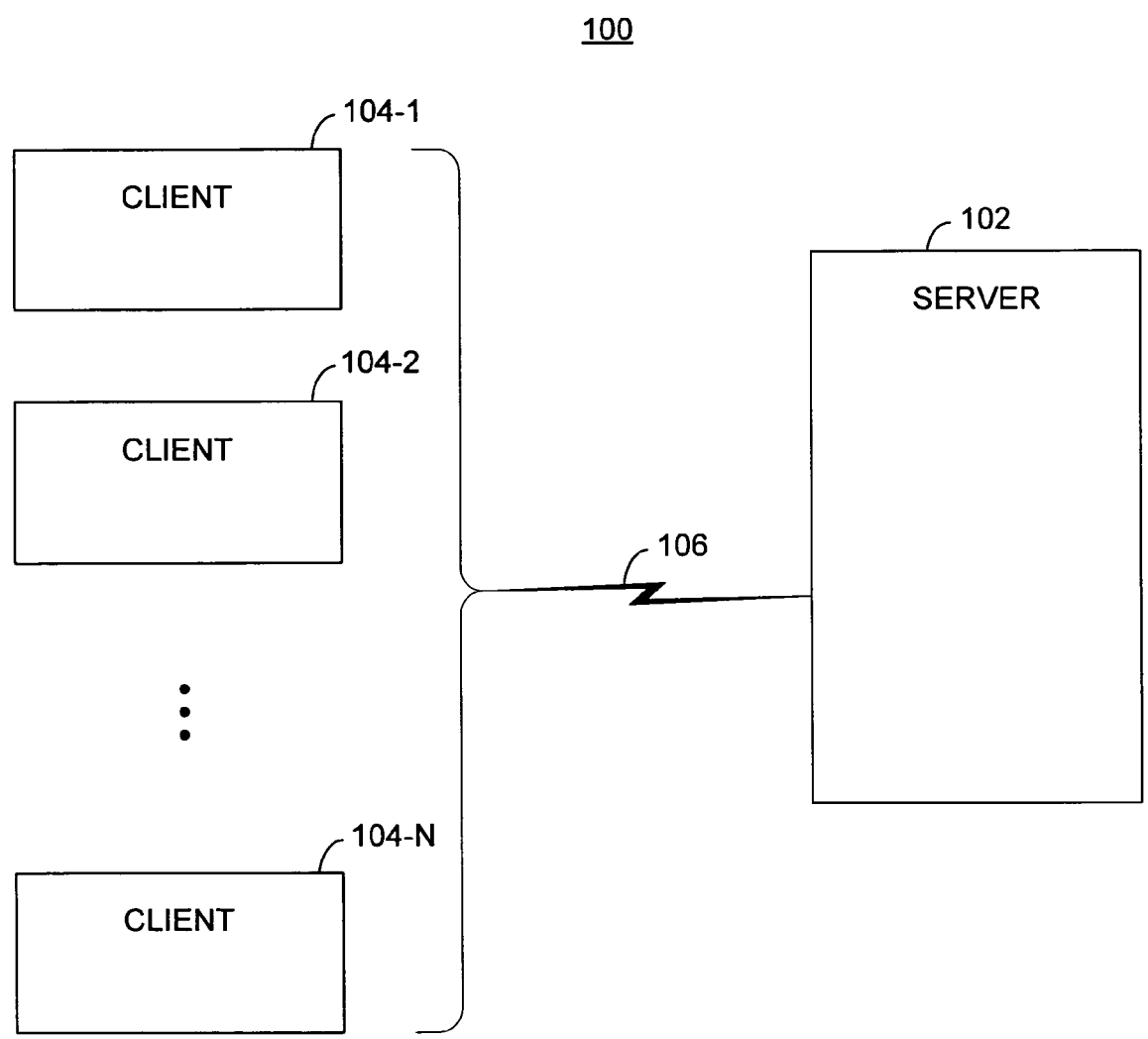
FIG. 1 is a block diagram illustrating an exemplary system for implementing embodiments of the invention.

Referring to FIG. 1, the system 100 illustrates an exemplary embodiment in which aspects of the invention may be implemented. A server 102, which may be one of a plurality of servers, includes components that enable the deployment of an operating system (OS) to a plurality of clients 104 via a networked environment 106. In one embodiment, the server 102 deploys the OS, such as MAC® OS X, UNIX®, Linux®, or Windows Vista™ operating system to the clients 104. The server 102 and the clients 104 may communicate via a number of underlying network transport mechanisms available in the networked environment 106. In one embodiment, the transport mechanisms include, Transmission Control Protocol (TCP), Trivial File Transfer Protocol (TFTP), User Datagram Protocol (UDP), Remote Procedure Call (RPC), File Transfer Protocol (FTP), HyperText Transfer Protocol (HTTP), or the like. In one example, server 102 in system 100 includes a server 200 described in FIG. 2.

The clients 104 include one or more computing devices, such as a desktop computer, a laptop computer, a personal digital assistant (PDA), or other devices. In another embodiment, server 102 and each of the clients 104 implement at least a part of a computer 130 depicted in FIG. 3.

In one example, system 100 may be used in a pre-boot execution environment (PXE). For example, server 102 may be a PXE server which watches for dynamic host configuration protocol (DHCP) discovery requests that include a special tag identifying the client as a PXE client. If the discovery request includes the tag, the PXE server replies to the client with configuration information, including the name of a boot image file, which may include an OS boot image, pre-OS image file, pre-boot agents (e.g., computer-executable instructions for scanning clients 104 for viruses before installing an OS). The boot image file may transferred to clients 104 using TFTP, and the transferred file may be used to boot the clients 104.

Figure 2:
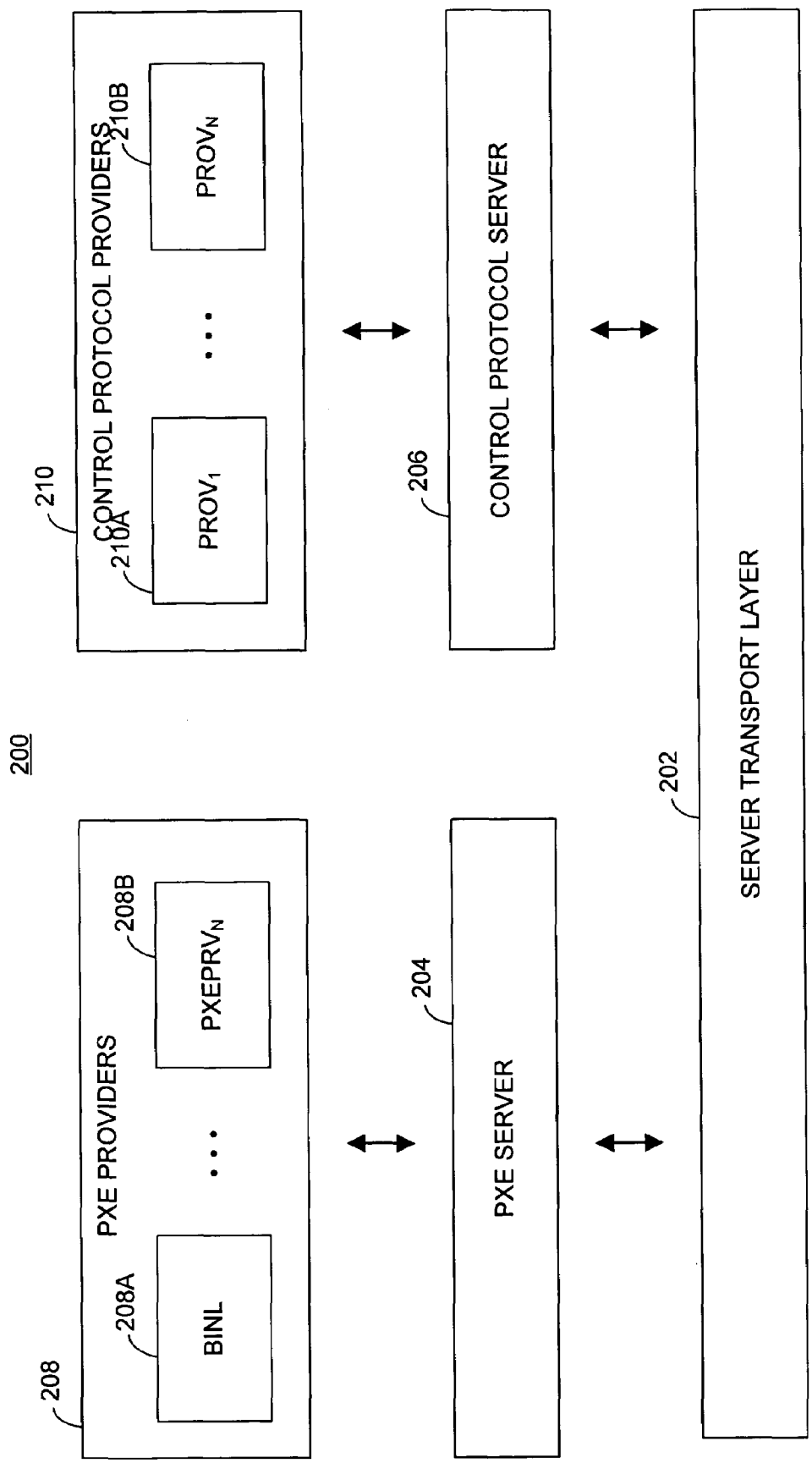
FIG. 2 is a block diagram illustrating an exemplary pre-boot environment according to an embodiment of the invention.

Referring now to FIG. 2, an exemplary embodiment of the server 200 of the invention is shown. The server 200 includes one or more components, such as a transport layer 202, a PXE server 204, and a Control Protocol Server 206. The transport layer 202 handles the details associated with communicating with clients and provides a transport-independent communication mechanism to the PXE Server 204 and the Control Protocol Server 206. In one embodiment, the transport layer 202 may communicate with the clients 104 utilizing a variety of network protocols including Transmission Control Protocol (TCP), User Datagram Protocol (UDP), Remote Procedure Call (RPC), and HyperText Transfer Protocol (HTTP).

The PXE server 204 accepts PXE requests from the clients 104. PXE is one of the components of the Wired for Management (WfM) specification that allows the clients 104 to boot from the PXE server 204 on a network prior to booting an operating system from a hard drive local to the clients 104. After receiving the PXE request from the client, the PXE server passes the request to a PXE provider 208. The PXE provider 208 is a component containing the application logic to formulate a response to the clients 104. In one embodiment, the PXE provider 208 is Boot Information Negotiation Layer 208A (BINL). The responsibilities of the BINL service 208 include answering the request, querying a directory service on behalf of the clients 104, as well ensuring that the correct policy and configuration settings are applied to the clients 104 during the operating system installation. In another embodiment, the PXE provider 208 includes two or more PXE providers 208, each with distinct application logic.

The Control Protocol Server 206 accepts requests from a reduced operating system environment. The reduced operating system aids in the deployment of the operating system. In one embodiment, the Control Protocol Server 206 accepts Microsoft® Windows® Preinstallation Environment (WinPE) requests. After receiving the request from the clients 104, the Control Protocol Server 206 passes the request to a Control Protocol Provider 210. The Control Protocol Provider 210 is a component containing the application logic to formulate a response to the clients 104. In one embodiment, the Control Protocol Provider 210 includes a plurality of providers, such as 210A, and 210B.

It is also to be understood that additional components connected, wired or wirelessly, to the server 200 may be added to perform operations of the transport layer 202, the PXE server 204, and the control protocol server 206.

Initially, a client (e.g., client 104-1) attempts to request to be booted by a server (e.g., PXE server 204). The request is received by the server which may be coupled with one or more other servers (e.g., a Windows® Deployment Services (WDS) server) or PXE providers for responding to the request.

In existing OS boot image file deployment systems, the server responds to the request by sending a standard or a predetermined OS boot image file to the client. However, the request from the client may identify an unknown client to the server. To deal with such situation, current deployment systems employ three basic models in responding to the requests from clients: responding to no clients, responding to all clients, and responding to a subset of designated clients. In the last model, the subset of designated clients is previously identified and is also known as "pre-staged clients" or "known" clients. Frequently, information of these pre-staged or known clients is stored in a data store.

In dealing with unknown clients (i.e., clients that are not pre-staged or whose information is in the data store), two usual processes are used for adding entries for booting client computers into the "known" client data store: a manual method and an automated method. The manual method requires manually entering entries into the data store for each unknown client. The automated method usually requires receiving a spreadsheet or other such file from a source (e.g., an OEM vendor) that lists all devices ordered from the vendor along with the unique identifiers of the system that needs to be recorded in the data store.

Embodiments of the invention provide a pending approval process which enables an option to approve a client that is currently unknown and place it in an intermediate storage (e.g., a queue) awaiting approval. During this time period, the client remains in a pending state until the client is approved or rejected by an administrator or an automated process. If the client is approved, it is added to the data store of known clients and the normal PXE boot process continues. If the client is rejected, the client is not allowed to boot via PXE.

Figure 3:
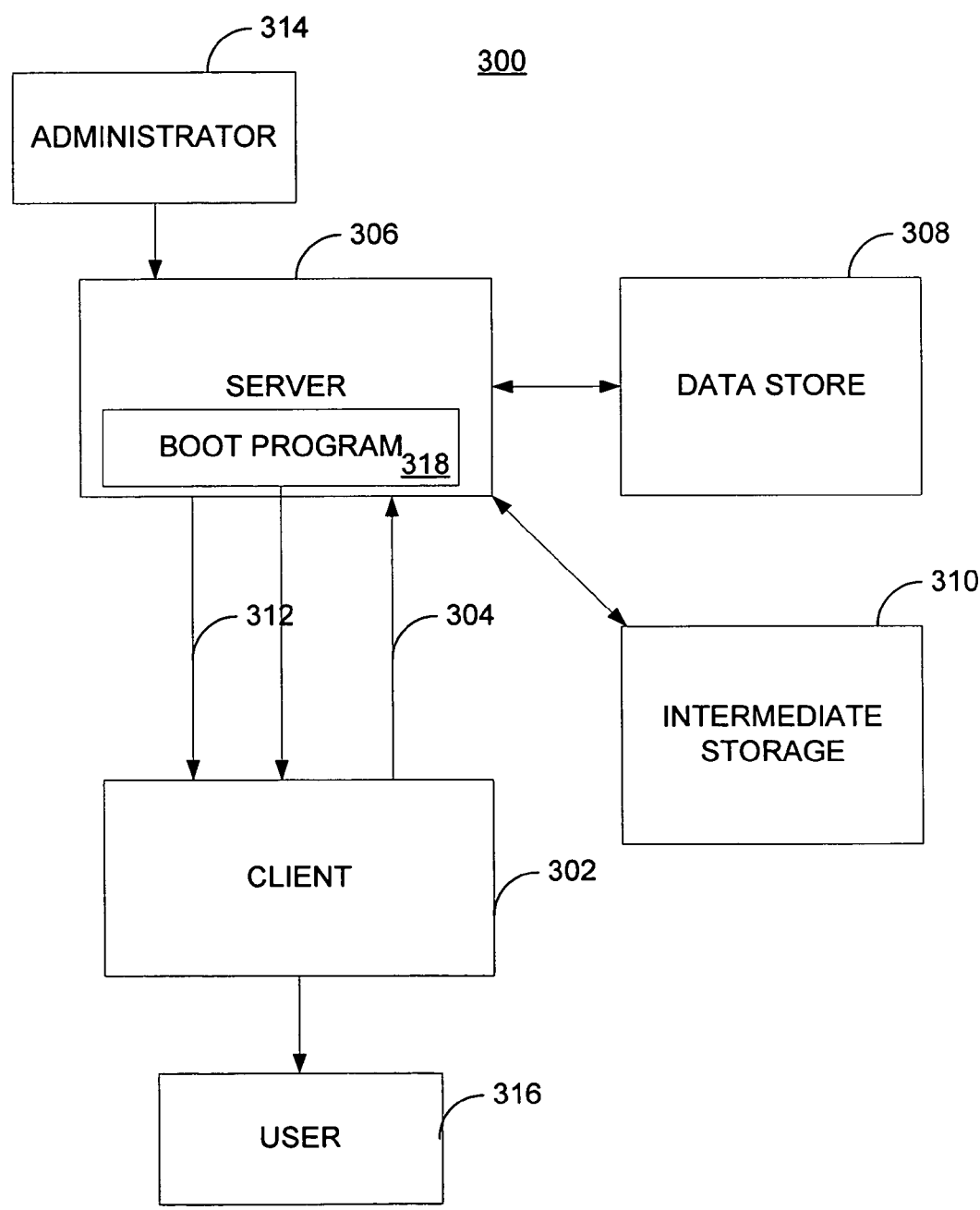
FIG. 3 is a block diagram illustrating a system for approving a client to boot from an image in a pre-boot execution environment according to an embodiment of the invention.

FIG. 3 is a block diagram illustrating a system 300 for approving a client to boot from an image in a pre-boot execution environment according to an embodiment of the invention. The system 300 includes a client 302 which transmits a request 304 to a server 306. In one embodiment, the server 306 is a PXE server and the request 304 includes a PXE request to boot the client 302. Upon receiving the request 304, the server 306 reads the request and determines whether client 302 is known/unknown by querying a data store 308. In one embodiment, the data store 308 stores information associated with computing devices (e.g., client 302), including computing architecture, chipset configuration, or the like.

If the client 302 is found in the data store 308, the device is "known." If client 302 is not "known," server 306 forwards or transmits request 304 to an intermediate storage 310 for further analysis whether to grant request 304 from client 302. In one example, the intermediate storage 310 is a queue. In another example, intermediate storage 310 may include other temporary storage areas for storing the request 304 such that server 306 makes the request 304 available for further evaluation whether to approve or grant the request 304 at a later time. In one example, request 304 remains in intermediate storage 310 for a pre-determined period of time (e.g., 24 hours) until at least one of the four things occur:

1. An administrator 314 approves request 304, thus granting the client 302 a right to boot from the server 306;

2. The administrator 314 denies request 304, thus denying the client 302 a right to boot from the server 306;

3. A timeout is reached by the server 306 after a pre-determined period of time (e.g., 6 hours), and the client 302 does not receive the requested boot image from the server 306; and 4. A user 316 operating the client 302 terminates or cancels request 304 or the administrator 314 cancels or terminates the approval process on server 306.

In one embodiment, during the time when client 302 is in intermediate storage 310, a special PXE network boot program 318 will be sent to client 302 to pause or delay the PXE boot. In doing so, the PXE boot by server 306 is paused or delayed, and the administrator may review request 304 in intermediate storage 310 and accept or deny request 304 accordingly. In addition, by pausing or delaying the booting process, embodiments of the invention efficiently avoid having client 302 being booted more than once.

For example, suppose the client 302 has one or more sources from which the client 302 can boot, such as a CD-ROM, the server 306, a hard drive, or the like. When the client 302 selects to boot from the server 306, the client 302 sends a request (e.g., request 304) to the server 306. The server 306 receives the request, and, querying the data store 308 and failing to locate the device information of the client 302 in the data store 308, the server 306 stores the request in the intermediate storage 310 to proceed the process described above. While the request is waiting for approval, the client 302 may have an internal time-out policy and may determine to boot from another source, such as the CD-ROM. In this situation, the client 306 may thus attempt to boot from the CD-ROM without informing the server 306. By the time the administrator 314 approves the request and the server 306 transmits an image to boot the client 302, the client 302 would have been booted twice (i.e., once by the CD-ROM and the server 302).

As such, embodiments of the invention include the PXE network boot program 318 to be sent to the client 302 to delay or pause the client during the PXE boot with the server 306 such that the client 302 would not proceed with its internal booting process while its request is being evaluated.

Alternatively, additional information apart from the information normally passed during PXE boot (e.g., a PXE boot packet) may be collected to help the administrator make a better determination whether to accept or reject the computing device. For example, this information could include one or more of the following information: computing device vendor, model number, or the like.

In another embodiment, an automated process (e.g., software, an application, or a collection of computer-executable instructions), instead of administrator manual approval process, may be employed to determine whether to approve or grant request 304. In another embodiment, factors for approving or granting request 304 include whether client 302 matches existing clients; whether client 302 is equipped with a certain type of hardware configuration, or the like.

Once the request 304 is responded to, either by an automated process or by the administrator 314, as a function of the evaluated device information, information associated with the client 302 may added to data store 308 such that the client 302 is now a "known" device. As such, server 306 transmits the requested boot image file to the client 302 via 312.

Figure 4:
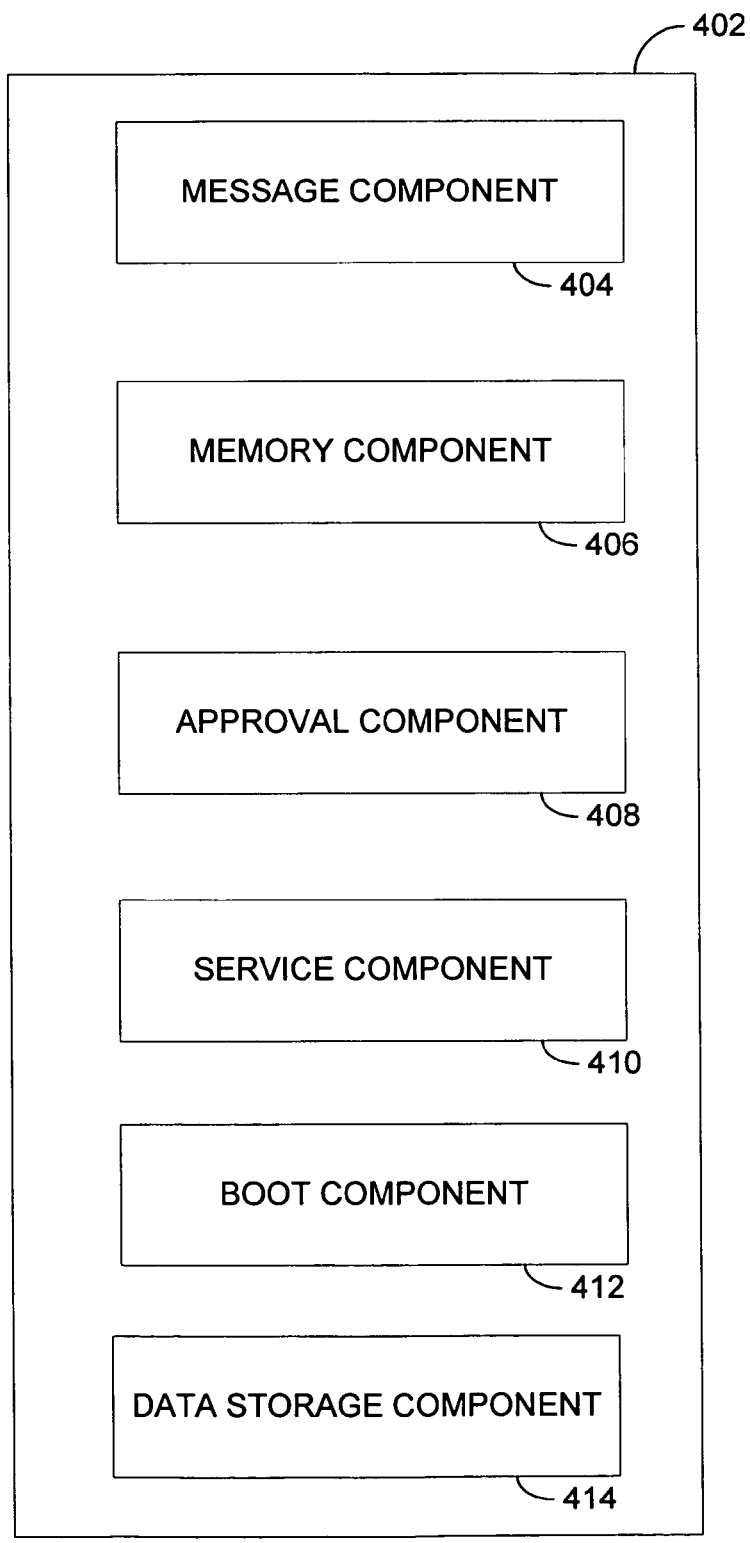
FIG. 4 is a block diagram illustrating an exemplary computer-readable medium on which aspects of the invention may be stored.

FIG. 4 is a block diagram illustrating an exemplary computer-readable medium 402 on which aspects of the invention may be stored. For example, components illustrated in FIG. 4 execute one or more computer-executable instructions described in the flow chart of FIG. 5 for approving a client to boot from an image in a pre-boot execution environment according to an embodiment of the invention.

For example, a message component 404 receives from a client (e.g., client 302) a request for booting at 502. The request includes information associated with the client. A memory component 406 queries a data storage component 414 storing a collection of known device information. If the information associated with the client is not found in the data storage component 414, the memory component 406 stores the request in a collection of unknown client information at 504. For example, the memory component 406 stores the request in an intermediate storage area such as intermediate storage 308 in FIG. 3. At 506, an approval component 408 determines whether to execute the received request by evaluating the client information in the stored request. A service component 410 responds to the received request as a function of the evaluated information. In an alternative embodiment, a boot component 412 delays or pauses the service component 410 in executing the received request when the request is stored by the memory component 406.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Figure 5:
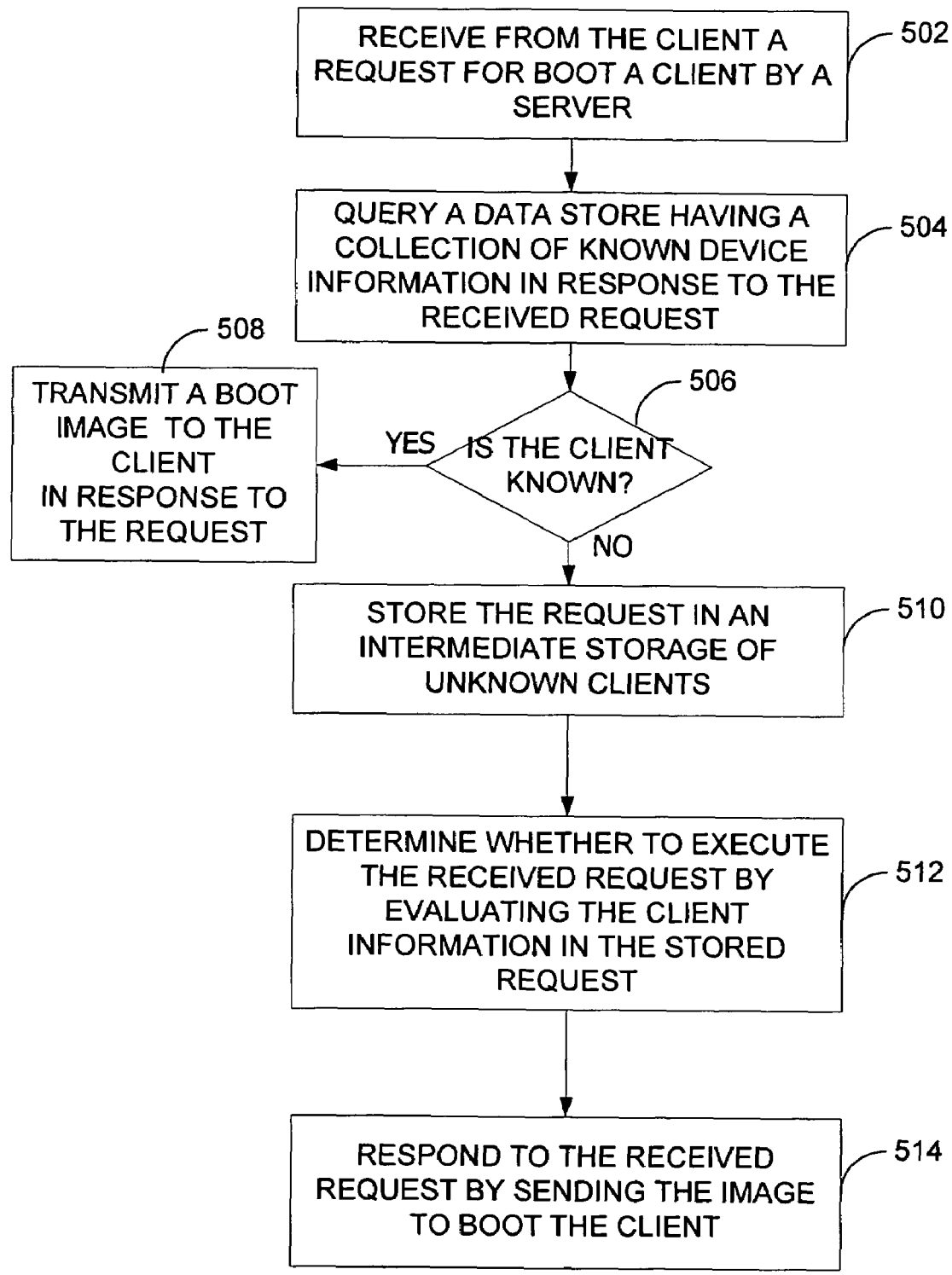
FIG. 5 is an exemplary flow chart illustrating operation of approving a client to boot from an image in a pre-boot execution environment according to an embodiment of the invention.

In operation, computer 130 executes computer-executable instructions such as those illustrated in FIG. 5 to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method implemented at least in part by a computing device for approving a client to boot in a pre-boot execution environment, said method comprising:

receiving from the client a request to boot the client by the computing device, said request including device information associated with the client, said device information comprising hardware information of the client;

querying a data store having a collection of known device information in response to the received request, said known device information comprising known hardware information of devices;

determining if the included device information in the request is stored in the data store in response to the querying;

if it is determined that the included device information is not in the data store, storing the request in a queue storing device information of unknown clients;

providing a notification to a user at the computing device to determine whether to execute the received request by evaluating the device information in the stored request;

sending a boot program to the client to delay any internal booting process of the client until a decision is made in response to the request from the client; and receiving an input from the user at the computing device indicating granting or denying the received request in response to the provided.

2. The method of claim 1, wherein received input comprises:

approving the client by adding the device information to the data store and transmitting an image corresponding to the device information in the request received from the client, or denying the request from the client.

3. The method of claim 2, wherein denying comprises denying the request after a pre-determined period of time.

4. The method of claim 2, wherein denying comprises denying the request in response to a cancellation request sent from the client.

5. The method of claim 1, wherein one or more computer storage media have computer-executable instructions for performing the method of claim 1.

6. A system for responding to a client to boot in a pre-boot environment, said system comprising:

a data store for storing a collection of known device information, said known device information comprising known hardware information of devices;

a processor executing computer-executable instructions, in response to the received request from the interface, for:

receiving from the client a request to boot the client, said request including device information associated with the client, said device information comprising hardware information of the client;

querying the data store;

determining if the included device information in the request is stored in the data store in response to the querying;

if it is determined that the included device information is not in the data store, storing the request in a queue storing device information of unknown clients;

sending a boot program to the client to delay any internal booting process of the client until a decision is made in response to the request from the client;

determining whether to execute the received request by evaluating the device information in the stored request; and responding to the received request as a function of the evaluated device information.

7. The system of claim 6, wherein the processor is configured to evaluate the request in response to an input from an administrator.

8. The system of claim 6, wherein the processor is further configured to perform one or more of the following operations:
   approving the client and transmitting an image corresponding to the device information in the request received from the client, or
   denying the request from the client.

9. The system of claim 8, wherein the processor denies the request from the client based on one or more of the following: after a pre-determined period of time, in response to an input from the administrator, or in response to a cancellation request from the client.

10. The system of claim 8, wherein the processor approves the client by adding the device information to the data store.

11. One or more computer storage media having one or more computer-executable components for approving a client to boot in a pre-boot environment, said computer-executable components comprising:
   a message component for receiving from the client a request to boot the client, said request including device information associated with the client, said device information comprising hardware information of the client;
   a data storage component for storing a collection of known device information, said known device information comprising known hardware information of devices;
   a memory component for querying the data storage component, wherein the memory component stores the request in a collection of unknown client information if it is determined that the device information included in the received request is not found in the collected of known device information;
   a boot component for sending a boot program to the client to delay any internal booting process of the client until a decision is made in response to the request from the client;
   an approval component for determining whether to approve the client by evaluating the information in the stored request; and
   a service component for responding the received request as a function of the evaluated information.

12. The computer storage media of claim 11, wherein the boot component delays the service component for granting the received request when the request is stored by the memory component.

13. The computer storage media of claim 11, wherein the approval component evaluates the request in response to an input from an administrator.

14. The computer storage media of claim 11, wherein the approval component further comprising:
   approving the client and transmitting an image corresponding to the information in the request received by the message component, and
   denying the request from the client.

15. The computer storage media of claim 14, wherein the service component is further configured to adding the evaluated information to the data storage component.

16. The computer storage media of claim 14, wherein the approval component denies the request from the client based on one or more of the following: after a pre-determined period of time, in response to an input from the administrator, and in response to a cancellation request from the client.

* * * * *

UNITED STATES PATENT AND TRADEMARK OFFICE
CERTIFICATE OF CORRECTION

| | | |
|---|---|---|
| PATENT NO. | : 7,574,592 B2 | Page 1 of 1 |
| APPLICATION NO. | : 11/358243 | |
| DATED | : August 11, 2009 | |
| INVENTOR(S) | : Dickens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 452 days.

Signed and Sealed this

Seventh Day of September, 2010

David J. Kappos
*Director of the United States Patent and Trademark Office*